US008203972B2

(12) United States Patent
Sauermann

(10) Patent No.: US 8,203,972 B2
(45) Date of Patent: *Jun. 19, 2012

(54) METHOD AND SYSTEM FOR COMPRESSING A TREE

(75) Inventor: Volker Sauermann, Dossenheim (DE)

(73) Assignee: SAP AG, Walldorf (DE)

( * ) Notice: Subject to any disclaimer, the term of this patent is extended or adjusted under 35 U.S.C. 154(b) by 1008 days.

This patent is subject to a terminal disclaimer.

(21) Appl. No.: 12/168,381

(22) Filed: Jul. 7, 2008

(65) Prior Publication Data

US 2009/0043796 A1 Feb. 12, 2009

Related U.S. Application Data

(63) Continuation-in-part of application No. 10/880,829, filed on Jun. 30, 2004, now Pat. No. 7,403,495.

(51) Int. Cl.
*H04L 12/28* (2006.01)
*G06F 7/00* (2006.01)
*G06F 13/12* (2006.01)

(52) U.S. Cl. ........ 370/256; 370/408; 707/797; 708/203; 710/68

(58) Field of Classification Search .................. 370/255, 370/256, 393, 401, 408; 707/101; 708/203; 710/68
See application file for complete search history.

(56) References Cited

U.S. PATENT DOCUMENTS

| | | | |
|---|---|---|---|
| 5,534,861 A | 7/1996 | Chang et al. | |
| 5,907,637 A | 5/1999 | Murashita et al. | |
| 6,523,102 B1 | 2/2003 | Dye et al. | |
| 6,654,760 B2 | 11/2003 | Baskins et al. | |
| 6,671,694 B2 | 12/2003 | Baskins et al. | |
| 7,143,115 B2 * | 11/2006 | Jones et al. | 707/822 |
| 7,366,113 B1 * | 4/2008 | Chandra et al. | 370/255 |
| 2001/0042186 A1 | 11/2001 | Iivonen et al. | |
| 2001/0042240 A1 * | 11/2001 | Ng et al. | 717/3 |
| 2002/0029229 A1 | 3/2002 | Jakopac et al. | |
| 2002/0107893 A1 * | 8/2002 | Ohkouchi et al. | 707/514 |
| 2003/0061189 A1 | 3/2003 | Baskins et al. | |
| 2003/0236793 A1 | 12/2003 | Karlsson | |
| 2004/0107185 A1 | 6/2004 | Najork et al. | |
| 2005/0018683 A1 | 1/2005 | Zhao et al. | |
| 2005/0027744 A1 | 2/2005 | Avadhanam et al. | |
| 2005/0240604 A1 | 10/2005 | Corl et al. | |

OTHER PUBLICATIONS

Edward R. Fiala and Daniel H. Greene, Data Compression with Finite Windows, Apr. 1989 vol. 32 No. 4, Communications of ACM.

(Continued)

*Primary Examiner* — Brandon Renner
(74) *Attorney, Agent, or Firm* — Kenyon & Kenyon LLP

(57) ABSTRACT

A method and system for compressing a tree with a plurality of nodes that each may be associated with a node identifier and a parent node identifier. The method may comprise for each node in the tree determining whether the current node is to be deleted, if the current node is to be deleted updating a list of deleted nodes such that the node identifier of the current node may be stored; a parameter representing a number of nodes currently having been deleted from the tree may be stored, such that the parameter is associated with the node identifier of the current node, and updating the node identifier and the parent node identifier of the current node as a function of the list of deleted nodes. Each node in the tree is visited only once.

20 Claims, 22 Drawing Sheets

OTHER PUBLICATIONS

Quentin F. Stoute and Bette L. Warren, Tree Rebalancing in Optimal Time and Space, Sep. 1986 vol. 29 No. 9, Communications of the ACM.

Jyrki Katajainene and Erkki Makinen, Three Compression and Optimization with Applications, Oct. 20, 1989 vol. 1 No. 4 (1990) pp. 425-447, International Journal of Foundations of Computer Science.

* cited by examiner

Figure 2

| Node ID | Parent ID | Node Name | Node Value |
| --- | --- | --- | --- |
| 1 | 0 | Topology | |
| 2 | 1 | Host | |
| 3 | 2 | p77287 | |
| 4 | 3 | Nameserver | |
| 5 | 4 | 8355 | |
| 6 | 5 | active | yes |
| 7 | 3 | Queueserver | |
| 8 | 7 | 8352 | |
| 9 | 8 | active | yes |
| 10 | 8 | write access counter | 4 |
| 11 | 8 | read access counter | 0 |
| 12 | 8 | Queue | |
| 13 | 12 | dpa_german | |
| 14 | 13 | type | master |
| 15 | 13 | status | writer |
| 16 | 3 | Indexserver | |
| 17 | 16 | 8351 | |
| 18 | 17 | active | no |
| 19 | 17 | write access counter | 2904 |
| 20 | 17 | read access counter | 0 |
| 21 | 17 | Index | |
| 22 | 21 | dpa_german | |
| 23 | 22 | type | master |
| 24 | 22 | status | search writer |
| 25 | 3 | Preprocessor | 8357 |
| 26 | 25 | 8357 | |
| 27 | 26 | active | yes |
| 28 | 26 | write access counter | 1 |
| 29 | 26 | read access counter | 0 |

| Node Name | Merge Node Offset | Merge Node Name | Merge Node Value | Alternative | Concatenate Names | Concatenate Icon | Left / Right | Separator | Remove Merge Node |
|---|---|---|---|---|---|---|---|---|---|
| Host | 1 | | | 1 | X | | R | : | X |
| Nameserver | 1 | | | 2 | X | | R | : | X |
| Nameserver | | active | yes | 3 | | icon_green_light | L | | |
| Nameserver | | active | no | 3 | | icon_red_light | L | | |
| Queueserver | 1 | | | 4 | X | | R | : | X |
| Queueserver | | active | yes | 5 | | icon_green_light | L | | |
| Queueserver | | active | no | 5 | | icon_red_light | L | | |
| Indexserver | 1 | | | 6 | X | | R | : | X |
| Indexserver | | active | yes | 7 | | icon_green_light | L | | |
| Index-server | | active | no | 7 | | icon_red_light | L | | |
| Proprocessor | 1 | | | 8 | X | | R | : | X |
| Proprocessor | | active | yes | 9 | | icon_green_light | L | | |
| Proprocessor | | active | no | 9 | | icon_red_light | L | | |

| Node ID | Delta |
|---------|-------|
| 3 | 1 |
| 5 | 2 |

Topology Tree Table

| Node ID | Parent ID | Node Name | Node Value |
|---|---|---|---|
| 1 | 0 | Topology | |
| 2 | 1 | Host | |
| 3 | 2 | p77287 | |
| 4 | 3 | Nameserver | |
| 5 | 4 | 8355 | |
| 6 | 5 | active | yes |
| 7 | 3 | Queueserver | |
| 8 | 7 | 8352 | |
| 9 | 8 | active | yes |
| 10 | 8 | write access counter | 4 |
| 11 | 8 | read access counter | 0 |
| 12 | 8 | Queue | |
| * | 8 | dpa_german | |
| ... | | | |

910 — Find next node with Node ID = Current Node ID + 1

Number of removed nodes N = 0

| Node ID | Delta |
|---|---|

Transformation Definition Table

| Node Name | Merge Node Offset | Merge Node Name | Merge Node Value | Alternative | Concatenate Names | Concatenate Icon | Left/Right | Separator | Remove Merge Node |
|---|---|---|---|---|---|---|---|---|---|
| Host | 1 | | | 1 | X | | R | .. | X |
| Nameserver | 1 | active | yes | 2 | X | icon_green_light | R | .. | X |
| Nameserver | | active | no | 3 | | icon_red_light | L | | |
| Nameserver | 1 | | | 3 | X | | L | | |
| Queueserver | | active | yes | 4 | | icon_green_light | R | .. | X |
| Queueserver | | active | no | 5 | | icon_red_light | L | | |
| Queueserver | | | | 5 | | | L | | |
| ... | | | | | | | | | |

Topology Tree Table

| Node ID | Parent ID | Node Name | Node Value |
|---|---|---|---|
| 1 | 0 | Topology | |
| 2 | 1 | Host: p77287 | |
| 3 | 2 | p77287 | |
| 4 | 3 | Nameserver | |
| 5 | 4 | 8355 | |
| 6 | 5 | active | yes |
| 7 | 3 | Queueserver | |
| 8 | 7 | 8352 | |
| 9 | 8 | active | yes |
| 10 | 8 | write access counter | 4 |
| 11 | 8 | read access counter | 0 |
| 12 | 8 | Queue | |
| * | 8 | dpa_german | |
| ... | | | |

Number of removed nodes (N = 1)

| Node ID | Delta |
|---|---|

Transformation Definition Table

| Node Name | Merge Node Offset | Merge Node Name | Merge Node Value | Alternative | Concatenate Names | Concatenate Icon | Left/Right | Separator | Remove Merge Node |
|---|---|---|---|---|---|---|---|---|---|
| Host | | | | 1 | | | | | |
| Nameserver | 1 | active | yes | 2 | X | | R | . | X |
| Nameserver | 1 | active | no | 3 | X | icon_green_light icon_red_light | L | . | X |
| Nameserver | | | | 3 | | | L | | |
| Queueserver | 1 | active | yes | 4 | | | R | | |
| Queueserver | | active | yes | 5 | X | icon_green_light icon_red_light | L | | X |
| Queueserver | | active | no | 5 | | | L | | |
| ... | | | | | | | | ... | ... |

FIG.10

Topology Tree Table

| Node ID | Parent ID | Node Name | Node Value |
|---|---|---|---|
| 1 | 0 | Topology | |
| 2 | 1 | Host: p77287 | |
| 3 | 2 | p77287 | |
| 4 | 3 | Nameserver | |
| 5 | 4 | 8355 | |
| 6 | 5 | active | yes |
| 7 | 3 | Queueserver | |
| 8 | 7 | 8352 | |
| 9 | 8 | active | yes |
| 10 | 8 | write access counter | 4 |
| 11 | 8 | read access counter | 0 |
| 12 | 8 | Queue | |
| * | 8 | dpa_german | |
| ... | | | |

⑤

Number of removed nodes (N = 1)

| Node ID | Delta |
|---|---|
| 3 | 1 |

④

Transformation Definition Table

| Node Name | Merge Node Offset | Merge Node Name | Merge Node Value | Alternative | Concatenate Names | Concatenate Icon | Left/Right | Separator | Remove Merge Node |
|---|---|---|---|---|---|---|---|---|---|
| Host | 1 | | | 1 | X | | R | .. | X |
| Nameserver | 1 | active | yes | 2 | X | icon_green_light | R | .. | X |
| Nameserver | | active | no | 3 | | icon_red_light | L | .. | |
| Nameserver | | | | 3 | X | | L | | |
| Queueserver | 1 | active | yes | 4 | | icon_green_light | R | .. | X |
| Queueserver | | active | no | 5 | | icon_red_light | L | .. | |
| Queueserver | | | | 5 | | | L | | |
| ... | | | | | | | | | |

Topology Tree Table

| Node ID | Parent ID | Node Name | Node Value |
|---|---|---|---|
| 1 | 0 | Topology | |
| 2 | 1 | Host: p77287 | |
| 4 | 3 | Nameserver | |
| 5 | 4 | 8355 | |
| 6 | 5 | active | yes |
| 7 | 3 | Queueserver | |
| 8 | 7 | 8352 | |
| 9 | 8 | active | yes |
| 10 | 8 | write access counter | 4 |
| 11 | 8 | read access counter | 0 |
| 12 | 8 | Queue | |
| * | 8 | dpa_german | |
| ... | ... | ... | ... |

1210 — Find next node with Node ID = Current Node ID + 1

Number of removed nodes N = 1

| Node ID | Delta |
|---|---|
| 3 | 1 |

Transformation Definition Table

| Node Name | Merge Node Offset | Merge Node Name | Merge Node Value | Alternative | Concatenate Names | Concatenate Icon | Left/Right | Separator | Remove Merge Node |
|---|---|---|---|---|---|---|---|---|---|
| Host | | | | | | | | | |
| Nameserver | 1 | active | yes | 1 | X | | R | ... | X |
| Nameserver | 1 | active | no | 2 | X | icon_green_light | R | ... | X |
| Nameserver | | | | 3 | | icon_red_light | L | | |
| Queueserver | | | | 3 | X | | L | ... | X |
| Queueserver | 1 | active | yes | 4 | | icon_green_light | R | | |
| Queueserver | 1 | active | no | 5 | | icon_red_light | L | | |
| | | | | 5 | | | L | | |
| ... | ... | ... | ... | ... | ... | ... | ... | ... | ... |

Topology Tree Table

| Node ID | Parent ID | Node Name | Node Value |
|---|---|---|---|
| 1 | 0 | Topology | |
| 2 | 1 | Host: p77287 | |
| 3 | 2 | Nameserver: 8355 | |
| 5 | 4 | 8355 | |
| 6 | 5 | active | yes |
| 7 | 3 | Queueserver | |
| 8 | 7 | 8352 | |
| 9 | 8 | active | yes |
| 10 | 8 | write access counter | 4 |
| 11 | 8 | read access counter | 0 |
| 12 | 8 | Queue | |
| * | 8 | dpa_german | |
| ... | | | |

Update Node ID and Parent ID
a) Node ID = Node ID − N
b) Parent ID = Parent ID − Delta Number of removed nodes (N = 1)

| Node ID | Delta |
|---|---|
| 3 | 1 |

Transformation Definition Table

| Node Name | Merge Node Offset | Merge Node Name | Merge Node Value | Alternative | Concatenate Names | Concatenate Icon | Left/Right | Separator | Remove Merge Node |
|---|---|---|---|---|---|---|---|---|---|
| Host | 1 | | | 1 | | | | | |
| Nameserver | 1 | active | yes | 2 | X | icon_green_light | R | : | X |
| Nameserver | | active | no | 3 | X | icon_red_light | R | : | X |
| Nameserver | | | | 3 | | | L | | |
| Queueserver | 1 | | | 4 | X | | L | | X |
| Queueserver | | active | yes | 5 | | icon_green_light | R | : | |
| Queueserver | | active | no | 5 | | icon_red_light | L | | |
| ... | | | | | | | | | |

Topology Tree Table

| Node ID | Parent ID | Node Name | Node Value |
|---|---|---|---|
| 1 | 0 | Topology | |
| 2 | 1 | Host: p77287 | |
| 3 | 2 | Nameserver: 8355 | |
| 4 | 3 | 8355 | |
| 5 | 4 | active | yes |
| 6 | 5 | Queueserver | |
| 7 | 3 | 8352 | |
| 8 | 7 | active | yes |
| 9 | 8 | write access counter | 4 |
| 10 | 8 | read access counter | 0 |
| 11 | 8 | Queue | |
| 12 | 8 | dpa_german | |
| * | ... | ... | ... |

Number of removed nodes (N = 2)

| Node ID | Delta |
|---|---|
| * | 1 |
| 5 | 2 |

Transformation Definition Table

| Node Name | Merge Node Offset | Merge Node Name | Merge Node Value | Alternative | Concatenate Names | Concatenate Icon | Left/Right | Separator | Remove Merge Node |
|---|---|---|---|---|---|---|---|---|---|
| Host | 1 | | | 1 | X | | R | ... | |
| Nameserver | 1 | active | yes | 2 | X | icon_green_light | R | ... | X |
| Nameserver | | active | no | 3 | | icon_red_light | L | ... | X |
| Nameserver | | | | 3 | | | L | | |
| Queueserver | 1 | | | 4 | X | | R | ... | |
| Queueserver | | active | yes | 5 | | icon_green_light | L | ... | X |
| Queueserver | | active | no | 5 | | icon_red_light | L | ... | |
| ... | | ... | ... | ... | ... | ... | ... | ... | ... |

| Node ID | Delta |
|---------|-------|
| 1 | 1 |
| 5 | 2 |
| 6 | 3 |

1810 — (row: 1, 1)
1820 — (row: 5, 2)
1830 — (row: 6, 3)

Figure 22

| Node ID | Parent ID | Node Name | Node Value |
|---|---|---|---|
| 1 | 0 | Topology | |
| 2 | 1 | Host: p77287 | |
| 3 | 2 | Nameserver: 8355 | |
| 4 | 3 | active | yes |
| 5 | 2 | Queueserver | |
| 6 | 5 | 8352 | |
| 7 | 6 | active | |
| 8 | 6 | write access counter | 4 |
| 9 | 6 | read access counter | 0 |
| 10 | 6 | Queue | |
| ... | ... | ... | ... |

METHOD AND SYSTEM FOR COMPRESSING A TREE

RELATED APPLICATIONS

This application is a continuation in part of U.S. application Ser. No. 10/880,829 filed Jun. 30, 2004 (pending), the contents of which are incorporated herein by reference.

FIELD OF THE INVENTION

The present invention relates to displaying hierarchical data in the form of a tree.

BACKGROUND INFORMATION

A tree is a data structure including a set of parent/child relationships between nodes. For example, hierarchical data, e.g., computer network data, may be displayed in the form of a tree which describes the hierarchical relationship between nodes in a computer network. A tree may be used to display visual information in a browser or in a tree controlled graphical user interface.

A topology tree is an example of a tree used to display visual information. A topology tree may displays technical information regarding nodes in a distributed computer environment. In the topology tree, the number of nodes may be high, since thousands of indexes and queues may exist in a distributed computer environment of hundreds of services and hosts.

In certain cases, it may be desirable to compress a tree for various reasons. For example, the tree may be compressed in order to improve the visual display of the tree and the user traversal of the tree. A tree may be compressed by merging nodes into other nodes of the tree.

A conventional method for the compressing a tree involves adjusting referring tree nodes in a tree table. A tree table lists all the tree nodes in the tree. The conventional method scans all entries in a tree table below a tree node entry set for deletion. If a parent identifier is found that is the same as the identifier of the deleted node, its value is changed to the node identifier of the parent of the deleted node. If the tree control requires contiguous node identifier values, then all node identifier below the removed line in tree table are decreased by one place to fill the gap in the numbering of node identifier values. The conventional method is repeated for each removed line in the tree table. The higher the node identifier of the removed line in the tree table (i.e., the lower it is in the table), the smaller the number of remaining entries below the removed line in the tree table that have to be visited.

This conventional method for the compressing a tree node provides that many table lines are visited (reading, comparing, or changing). If the table has N lines and M nodes are removed, then in the worst case (where all nodes to be removed are near the top of the table) the number of visited nodes is on the order of M×N. If the nodes to be removed are distributed evenly in the table, then the number of table lines to be visited is on the order of ½×M×N.

However, performing compression on lengthy trees may involve a considerable amount of processing load. The number of nodes may be high in a distributed computer environment and a tree may consist of N=2000 nodes from which M=100 nodes may be removed as a result of node merging. In such a case, the number of visited nodes whose identifiers have to be investigated and perhaps changed is on average ½×M×N~100 000. The precise number depends on the distribution of nodes to be removed over the table. Visiting such a large number of nodes represents a considerable processing load for displaying the reduced tree.

SUMMARY

The present invention provides for a method and system for compressing a tree involving setting a current node identifier as a root node of the tree. If the current node identifier references a node to be deleted, the node referenced by the current node identifier is deleted from the tree, the current node identifier is stored, a parameter is stored which represents a number of nodes currently having been deleted from the tree, the parameter is associated with the stored current node identifier, and the current node identifier is updated to reference a next node of the tree. If an identifier for a parent node of the node referenced by the current node identifier has previously been stored, the node identifier of the current node is set as a difference of the node identifier referenced by the current node identifier and a total number of nodes having been current deleted from the tree, and the parent identifier of the current node is set as a difference of a node identifier of the parent node and the parameter associated with the parent identifier. Then the current node is sent to an unvisited child node of the current node. The method of the present invention is repeated until all nodes in the tree have been visited.

BRIEF DESCRIPTION OF THE DRAWINGS

FIG. 2 shows a topology tree table.

FIG. 4 shows a transformation definition table.

FIG. 6 shows an exemplary embodiment of a delta table according to the present invention.

FIG. 9 shows the node immediately following the current node that is found in the tree topology table.

FIG. 10 shows the execution of the steps for applying of a rule contained in the transformation definition table.

FIG. 11 shows the execution of the steps for applying of a rule contained in the transformation definition table.

FIG. 12 shows the tree node immediately following the current node.

FIG. 14 shows use of a delta table and of a number of removed nodes.

FIG. 15 shows the application of the rule contained in a transformation definition table.

FIG. 18 shows a delta table.

FIG. 22 shows a top portion of the topology tree table shown in FIG. 2 after applying a compression method in accordance with the present invention

DETAILED DESCRIPTION

The present invention provides for a method and system for compressing a tree involving setting a current node identifier as a root node of the tree. If the current node identifier references a node to be deleted, the node referenced by the current node identifier is deleted from the tree, the current node identifier is stored, a parameter is stored which represents a number of nodes currently having been deleted from the tree, the parameter is associated with the stored current node identifier, and the current node identifier is updated to reference a next node of the tree. If an identifier for a parent node of the node referenced by the current node identifier has previously been stored, the node identifier of the current node is set as a difference of the node identifier referenced by the current node identifier and a total number of nodes having been current deleted from the tree, and the parent identifier of the current node is set as a difference of a node identifier of the parent node and the parameter associated with the parent identifier. Then the current node is sent to an unvisited child node of the current node. The method of the present invention is repeated until all nodes in the tree have been visited.

To compress a tree according to the present invention, a tree is traversed and when a currently visited node is deleted, a delta table may be used such that it is updated so as to store a current node identifier and a parameter. The parameter represents a number of nodes currently having been deleted from the tree and the parameter is associated with the stored current node identifier. The term delta table is used to describe information including a current node identifier and a parameter that represents a number of nodes currently having been deleted from the tree, the parameter is associated with the stored current node identifier.

The present invention provides a method and system for merging nodes in a tree, e.g., a topology tree. The present invention provides for tree compression that reduces the processing load for displaying the reduced tree. An exemplary embodiment of the present invention provides a delta table and a counter N. The delta table is used to update the node IDs and parent IDs of all nodes in the tree table. The counter N is used to track the number of deleted nodes. Removing a node from the tree is equivalent to deleting the corresponding line of that node from the tree table. Each time this happens, the counter N is incremented by 1. So at each point in time, the counter N contains the current number of nodes that have been removed from the tree up to that time.

Figure 1:
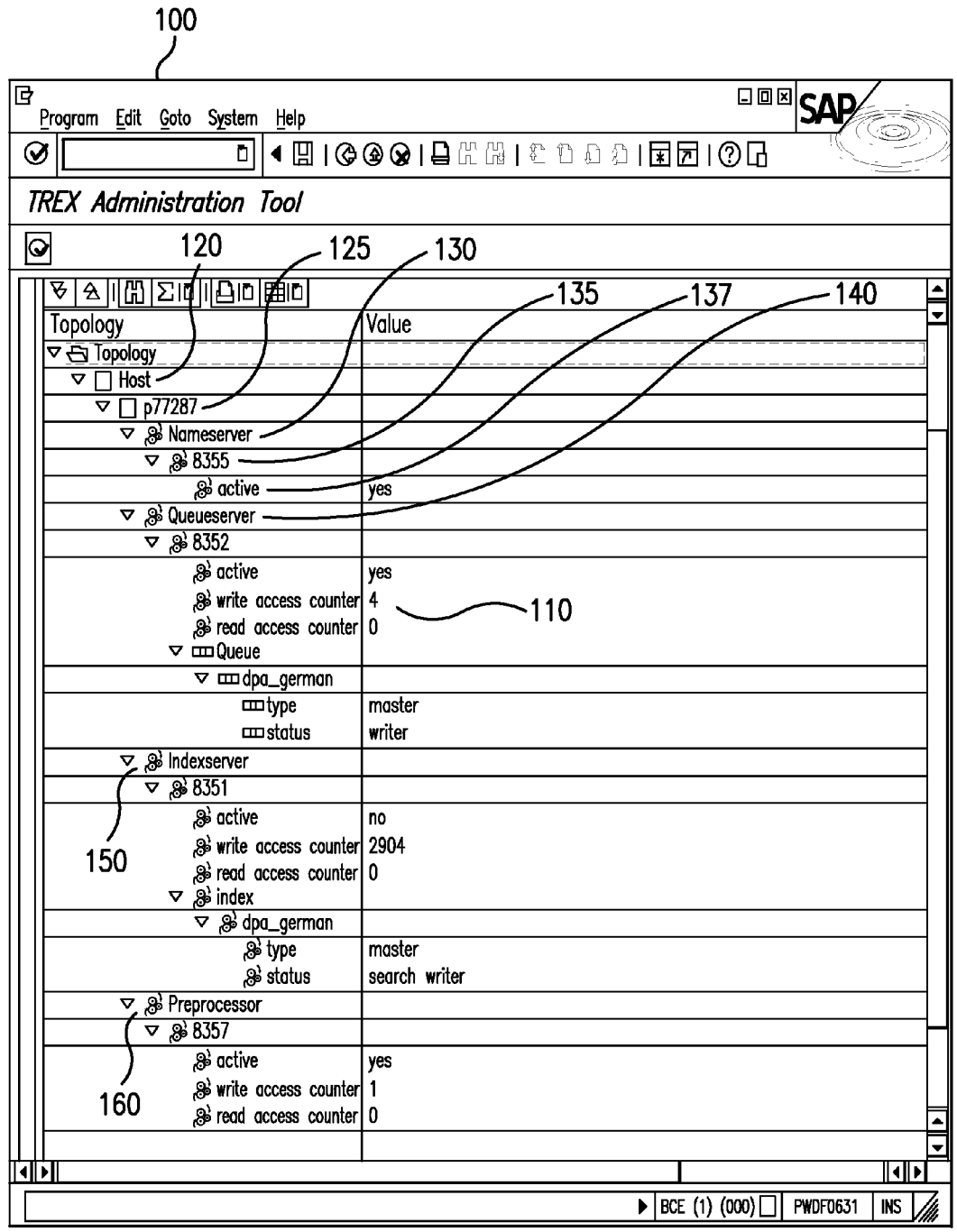
FIG. 1 shows a topology tree.

FIG. 1 shows an example of displaying hierarchical data in the form of a topology tree 110. FIG. 1 includes a user interface (UT) 100 for a network administration transaction. The topology tree 110 displays technical information regarding a search engine running in a distributed computer environment. The topology tree 110 is displayed during an administration transaction in a computer network. The transaction may be implemented via a computer programming language, e.g., C++, Java, ABAP, etc. The topology tree 110 displays which services of the search engine are running on which host computer. By navigating deep down into the topology tree 110, the user may find information about the current status of the services of the search engine. In FIG. 1, the Nameserver 130, Queueserver 140, Indexserver 150, and Preprocessor 160 services are running on host p77287 120, 125. The Indexserver 150 service is inactive while the Nameserver 130, Queueserver 140, and Preprocessor 160 services are active. Additional technical parameters are displayed for each service. The technical parameters may include values for write access counters and read access counters in the case of the Queueserver 140, Indexserver 150, and Preprocessor 160 services.

The topology tree 110 in FIG. 1 has many hierarchical levels. A user finds out if the Nameserver 130 is active or inactive by:

Clicking on the folder labeled "Host" 120 which displays a node below the

"Host" folder. The node is a folder labeled with host name "p77287" 125.

Clicking on folder "p77287" 125 to display a folder "Nameserver" 130.

Clicking on the "Nameserver" 130 folder to display another folder below the Nameserver 130 folder. The newly displayed folder is labeled with port number "8355" 135.

Clicking on folder "8355" to display the information "active yes" 137.

In this example, the user has opened four folders. This navigation is problematic and not very user friendly due to the high number of hierarchical levels. Such a complicated topology tree with many hierarchical levels is displayed because of the pseudo-Extensible Markup Language (XML) format used by the search engine. The topology tree displays the same tags and levels that are used in the XML format within the search engine (except for XML end tags such as </nameserver>).

An XML string that corresponds to the topology tree shown in FIG. 1 may be as follows:

```
<topology>
  <host>
    <p77287>
      <nameserver>
        <8355>
          active=yes
        </8355>
      </nameserver>
      <queueserver>
        <8352>
          active=no
          write_accesscounter=4
          read_accesscounter=0
          <queue>
            <dpa_german>
              type=master
              status=writer
            </dpa_german>
          </queue>
        </8352>
      </queueserver>
   <indexserver>
        <8351>
      active=no
      write_accesscounter=2904
      read_accesscounter=0
      <index>
      <dpa_german>
      type=master
      status=searchwriter
        </dpa_german>
      </index>
        </8351>
   </indexserver>
   <preprocessor>
   <8357>
   active=no
   write_accesscounter=1
   read_accesscounter=0
   </8357>
   </preprocessor>
```

```
            </p77287>
        </host>
```

An administration transaction in a computer network does not receive an XML string. The XML string is converted into a flat table by the search engine. The flat table is sent to the administration transaction as response to a request call from the administration transaction.

The flat table may be a topology tree table 200 as shown in FIG. 2. The node ID 210 is an integer value. The integer values in the table are contiguous, starting with 1 for the top node. The parent ID 220 is the node ID 210 of the parent node 220. For example, the node with node name "p77287" has node ID 3 and is a child of the node with ID 2. A child node is one hierarchy level below its parent node. The child node is only visible on the user interface (UT) 100 in FIG. 1 when the parent node is clicked to open the subtree one hierarchy level below. The node name is displayed as the label of the node in the UT 100. The node name is listed in the node name column 230. If the node has a value, this value is displayed in the node value column 240 on the UI 100.

Figure 3:
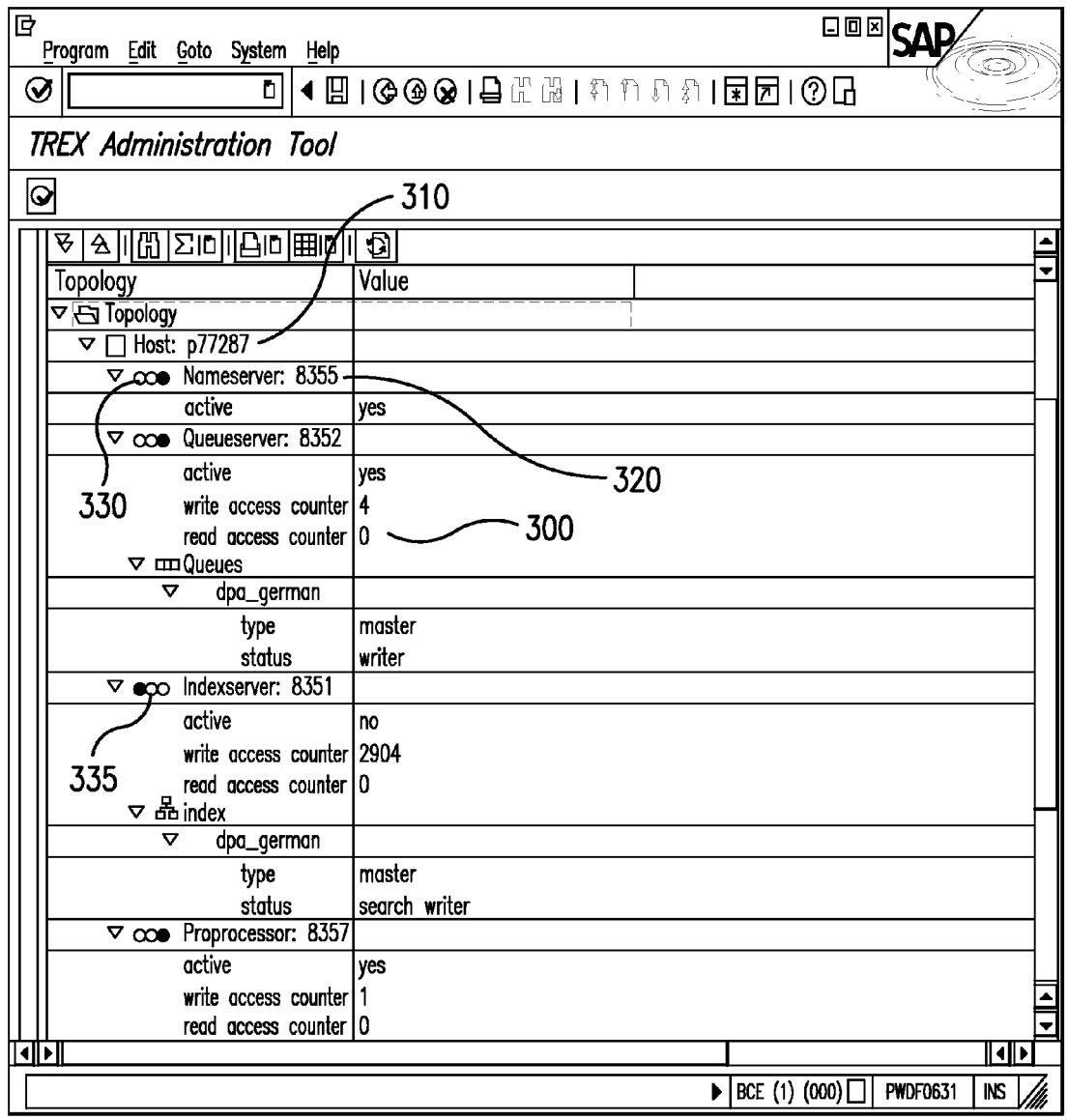
FIG. 3 shows a topology tree after a transformation process.

FIG. 3 shows a topology tree 300 after a transformation process involving merging information distributed over several nodes into one node. As discussed above, topology tree navigation is problematic due to the high number of hierarchical levels. Usability of a topology tree may be improved by merging information distributed over several nodes into one node. For example, the node "Host" 120 may be labeled as "Host: p77287" 310. Hence, node labeled "p77287" 125 in FIG. 1 is eliminated. Also, the two levels with nodes labeled "Nameserver" 130 and "8355" 135 may be merged into a node "Nameserver: 8355" 320. The same principle of merging nodes applies to the other services and the corresponding port number nodes shown in FIG. 1. Additionally, a green traffic light 330 or red traffic light 335 may be displayed on the node for a service and may replace the entry "active yes" or "active no". For example, this may result in a node labeled "<green light icon> Nameserver: 8355" 320. The same principle may be applied for the corresponding nodes of the other services.

The affect of the transformation process on the topology tree of FIG. 1 is shown in FIG. 3. In FIG. 3, the entries "active yes/no" may be removed. The benefit of merging nodes is a compression of the tree such that there are fewer navigation levels, more information on each node, and the attribute lists are shorter. For example, the attribute "active yes/no" may be replaced by a traffic light icon on a superordinate node. In FIG. 3, the attribute "active yes/no" node is still displayed such that it provides textual information to people that may not be able to distinguish colors and may not be able to recognize traffic light icons. However, traffic light icons may enhance the tree node such that users recognize the traffic light icons and are able to obtain "active" node information at a first glance without having to open the respective subordinate folders.

The usability of a topology tree may be improved by tree compression, as in FIG. 3, on the basis of the information contained in table 200 in FIG. 2. The administration transaction displays a reduced table as a topology tree such that the incoming table 200 which is passed by the search engine is not displayed. Before the topology tree is displayed to the user, the number of entries in table 200 is reduced by merging the contents of certain nodes as discussed above in reference to FIG. 3 and by deleting lines from the table 200. The administration transaction receives table 200 from the search engine. The table 200 is transformed by merging nodes in accordance with a transformation definition table. FIG. 4 shows an example of a transformation definition table 400. The transformation definition table 400 defines which nodes are to be merged and how.

All the nodes of the table 200 are scanned. For each node, the transformation definition table 400 is examined to see if there are any entries for the name of that node in the Node Name column 410 of the table 400 in FIG. 4. The Node Name column 410 includes the names of nodes that will be enhanced by being merged with other nodes. For example, when table 200 includes a node with name "Host", table 400 is examined for the first line containing the details of the merging process for node name "Host".

In table 400, the value of 1 in the Merge Node Offset column 420 signifies that the node should be merged with the node that has an ID with a value offset of 1. For example, for the first line of table 400, with node name "Host", the node with ID 2 in table 200 should be merged with the node with ID 3 in table 200, since 2 offset 1 is 3. In the first line of table 400, there are no specified values in columns Merge Node Name 430 and Merge Node Value 440. The values in column Alternative 450 provide a running index for the lines in table 400. If two or more lines have the same index value, the lines form a group of alternatives from which one line is chosen depending on the properties of the node with the same name listed in table 200. The values in this column 450 do not need to be successive, but they do need to be different for lines that are not alternatives.

In the first line of table 400, column Concatenate Names 460 is flagged with value "X", so the node name of the node to be merged (node ID 3 in table 200) is concatenated to the node name "Host" (node ID 2 in table 200). If no value had been entered in this column but instead a value had been entered in the Concatenate Icon column 470, the corresponding icon would have been concatenated to the name. Still in first line of table 400, Value "R" in column Left/Right column 480 specifies that the name or icon to be concatenated should be set to the right of the name. The value in Separator column 490 specifies that the concatenated items are to be separated by ":". Flag "X" in column Remove Merge Node column 495 specifies that the node to be merged (node ID 3 in table 200) should be removed from the tree.

In table 200, a line with node name "Nameserver" (node ID 4) is found. Three corresponding lines in table 400 are then found. The three lines are evaluated in the order in which they are listed in table 400. The first "Nameserver" line (the second line of table 400) is similar to the line for the "Host" node: it says the subsequent node (offset 1, which specifies the node with ID 5 in table 200) should be merged with the current node (ID 4 in table 200) by concatenating the name of the subsequent node to the right ("R") of the string "Nameserver", separated by ":". After this operation, the subsequent node (ID 5 in table 200) is removed ("X") from the tree.

The next two "Nameserver" lines in table 400 belong together, since they have the same values in column Alternative 450. Depending on the node properties, one of the two alternatives is chosen to perform a merging operation. In table 400, the two lines representing alternative 3 refer to the node with node name "Nameserver" (ID 4 in table 200). For alternative 3, the merge node is not determined by an offset (like value 1 for alternatives 1 and 2) but by an entry in column Merge Node Name 430, in this case "active". Then table 200 is read and the next node with node name "active" (which is ID 6 in table 200) is found. The node value entry "yes" for this node is compared with the respective entries in table 400 in column Merge Node Value 440. For the node value "yes" in table 200, the first line of alternative 3 in table 400 applies and a green light icon is chosen. If the node value "no" appeared in table 200, the second line of alternative 3 in table 400 would apply and a red light icon would be chosen. The chosen icon is set to the left ("L") of the node name without a separator. In table 400, there is no "X" in the last column for alternative 3, so the "active" node (ID 6 in table 200) is not removed from the tree.

The final name of the node with ID 4 in table 200 is "<icon green light> Nameserver: 8355". FIG. 3 shows the result.

The other lines in table 400, for nodes with names "Queueserver", "Indexserver", and "Preprocessor", are interpreted similarly.

The transformation definition table 400 encodes the different merge options into a flat table. Other formats may be chosen (such as a simple string that may be parsed or Extensible Stylesheet Language Transformations (XSLT)) and interpreted appropriately by the transformation method. This manner of encoding the options avoids the need to hard-code the semantics contained in the transformation definition table 400 in the transformation method. Use of a transformation definition table 400 or other appropriate format offers more flexibility, for example, if the XML format of the tree changes, or the decision is made to merge further nodes. In such cases, no coding has to be changed, and all that is required is to modify the table entries or extend the table with new entries.

The information contained in the transformation definition table may be stored (perhaps in a different format) in an initialisation file. The initialisation file may be passed from the search engine to the administration transaction or may be part of the customising of a computer network system.

In the tree transformation method for merging nodes in a topology tree, deleting lines from table 200 involves two cases according to the requirements of the tree control which is responsible for displaying the topology tree on the UI:

The tree control requires contiguous values for all node IDs. If nodes are removed (table lines are deleted), the node IDs of all subsequent nodes need to be adjusted to close the gaps in the numbering.

The tree control does not require contiguous values for the node IDs.

In either of the cases, the hierarchical information and above all the parent-child relationship of nodes that are not merged must not be changed. Therefore, whenever a node is removed from the tree by deleting the corresponding line from table 200, all nodes that refer to the removed node (specified in column Parent ID 220) must be changed to refer to the parent node of the removed node. In other words, the parent IDs of all nodes referring to a removed node must be changed. For example, when the table line with node ID 3 is deleted from table 200, the nodes with node IDs 4, 7, 16, 25 must refer to node ID 2 instead.

Referring nodes may be adjusted by scanning all entries in table 200 below the deleted entry. If a parent ID is found that is the same as the ID of the deleted node, its value is changed to the node ID of the parent of the deleted node. If the tree control needs contiguous node ID values, then in addition all node IDs below the removed line in table 200 are decreased by one place to fill the gap in the numbering of node ID values. This procedure is repeated for each removed line. The higher the node ID of the removed line (that is, the lower it is in the table), the smaller the number of remaining entries below the removed line that have to be visited.

This approach provides that many table lines are visited (reading, comparing, or changing). If the table has N lines and M nodes are removed, then in the worst case (where all nodes to be removed are near the top of the table) the number of visited nodes is on the order of M×N. If the nodes to be removed are distributed evenly in the table, then the number of table lines to be visited is on the order of ½×M×N.

The number of nodes may be high, since thousands of indexes and queues may exist in a distributed computer environment of hundreds of services and hosts. For example, if a tree consists of N=2000 nodes from which M=100 nodes are removed as a result of node merging, then the number of visited nodes whose IDs have to be investigated and perhaps changed is on average ½×M×N~100,000. The precise number depends on the distribution of nodes to be removed over the table.

Visiting such a large number of nodes represents a considerable processing load for displaying the reduced tree. In the case of large trees, which occur in search engine scenarios for large computer networks, this straightforward approach is not very useful.

Figure 5:
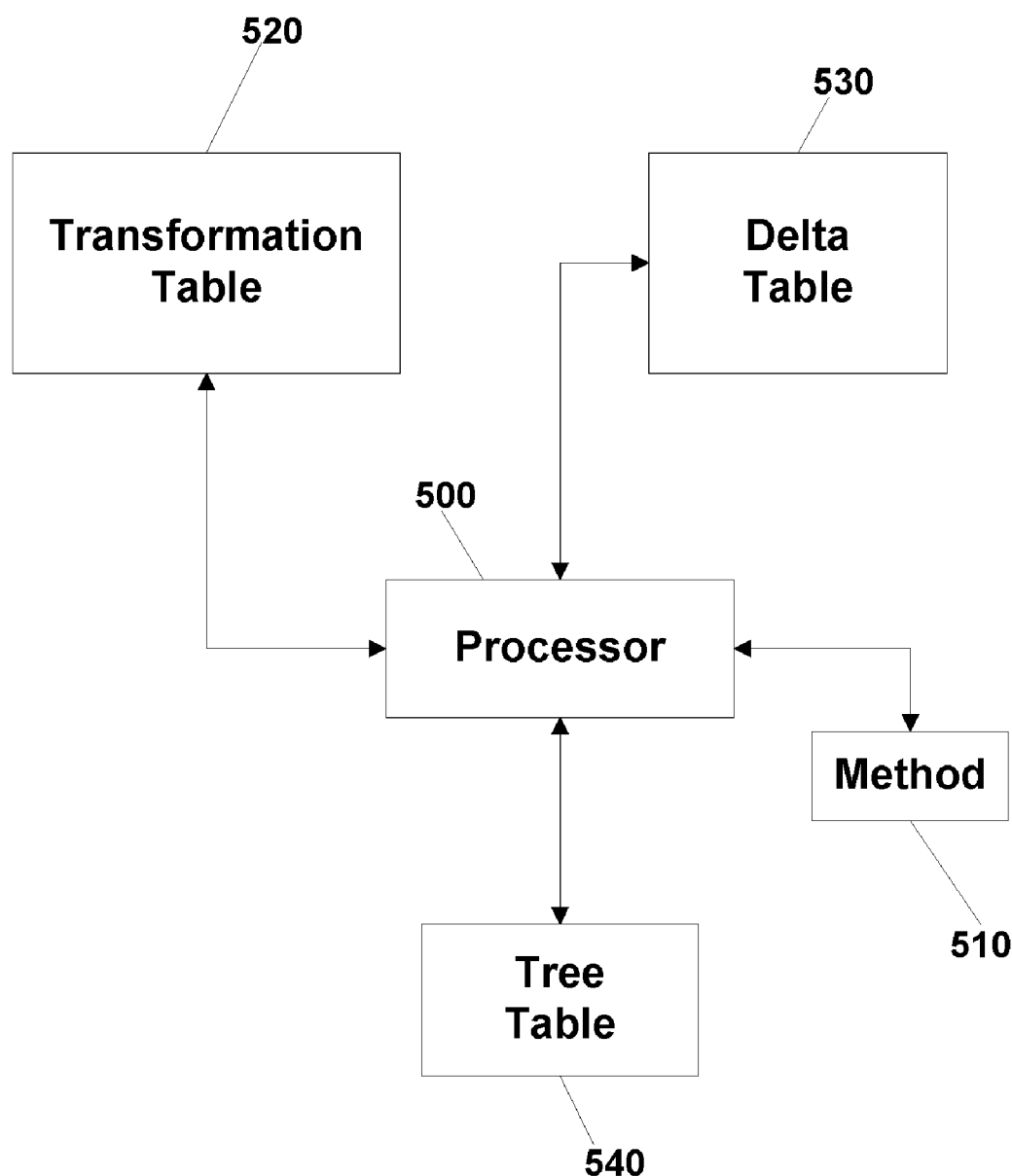
FIG. 5 shows an exemplary embodiment of a system according to the present invention.
Figure 6:
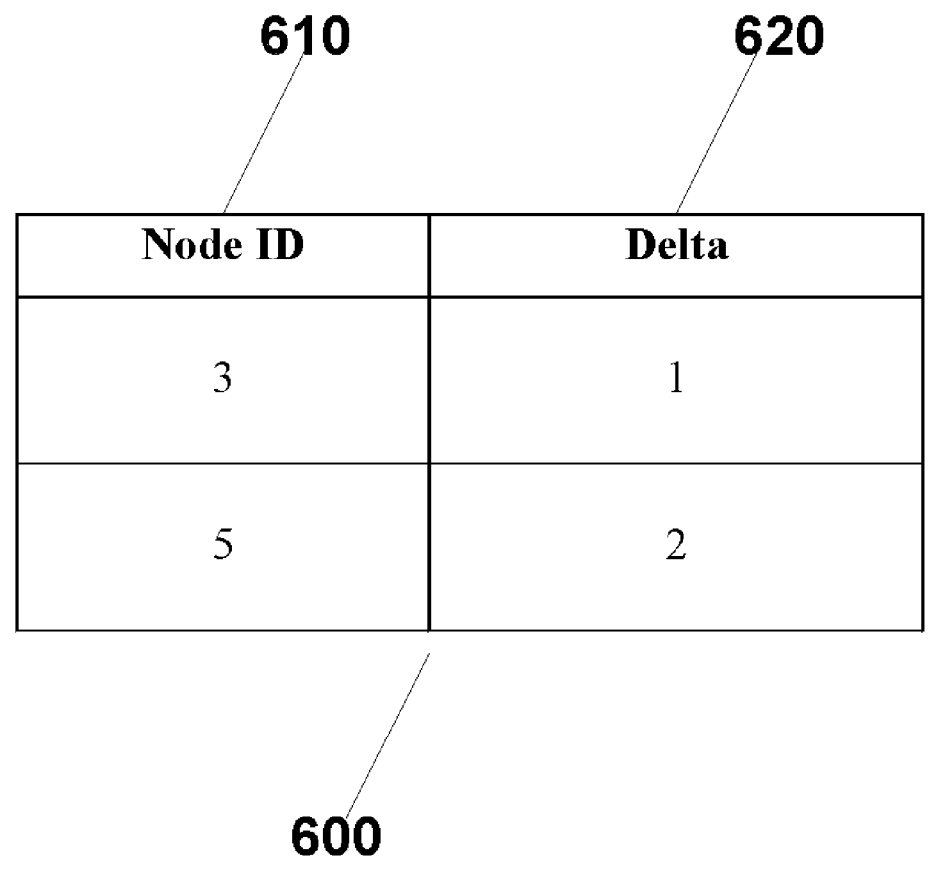

FIG. 5 shows an exemplary embodiment of a system according to the present invention. The system is configured to execute the method described herein, including the method referred to in FIG. 7. A processor 500 executes the program 510 according to the present invention. The processor 500 may include a computer server arrangement, a personal computer, a database system, a computer network, a computer-readable storing medium, a storage subsystem, a display arrangement, a wireless computing device and/or a wireless computing network. The program 510 according to the present invention may be stored as a set of instructions that is accessible and executable by the processor 500. This set of instructions may stored in a storage subsystem that may include a compact disk, hard drive, DVD-ROM, CD-ROM or any type of computer or machine readable medium. The processor 500 executes the program 510 with reference to the transformation table 520, the delta table 530, and the tree table 540. An exemplary delta table 530 is shown in FIG. 6. An exemplary transformation table 520 is table 400 as shown in FIG. 4. An exemplary topology tree table 540 is table 200 as shown in FIG. 2. The transformation table 520, the delta table 530, and the tree table 540 may be stored in a storage subsystem that is accessible to the processor 500.

FIG. 6 shows an exemplary embodiment of a delta table according to the present invention. The delta table 600 includes a Node ID column 610 and a Delta column 620.

Figure 7:
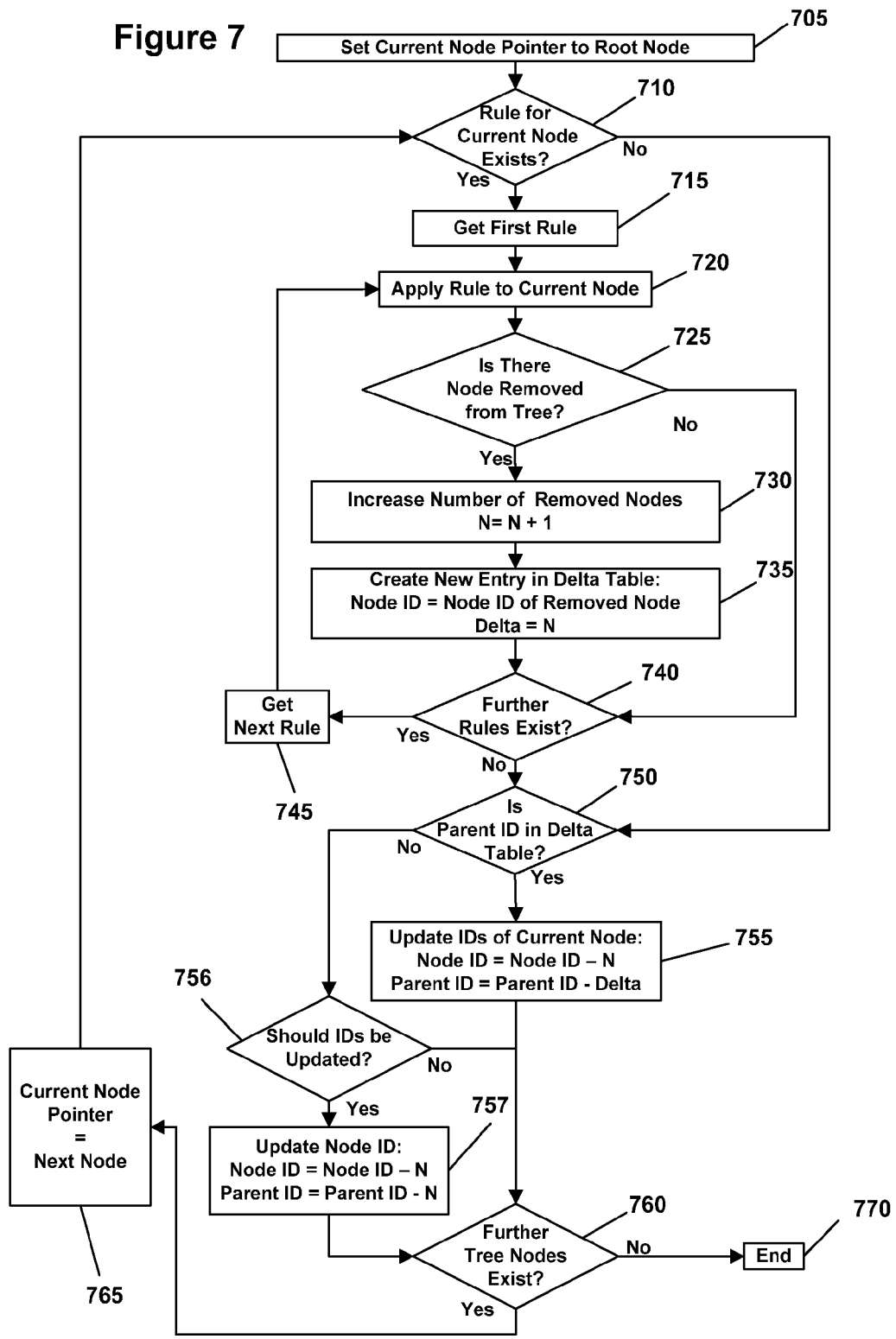
FIG. 7 shows an exemplary embodiment of a method according to the present invention.

FIG. 7 shows an exemplary embodiment of a method according to the present invention. FIG. 7 is described below with reference to FIGS. 16, 17, and 18.

Figure 16:
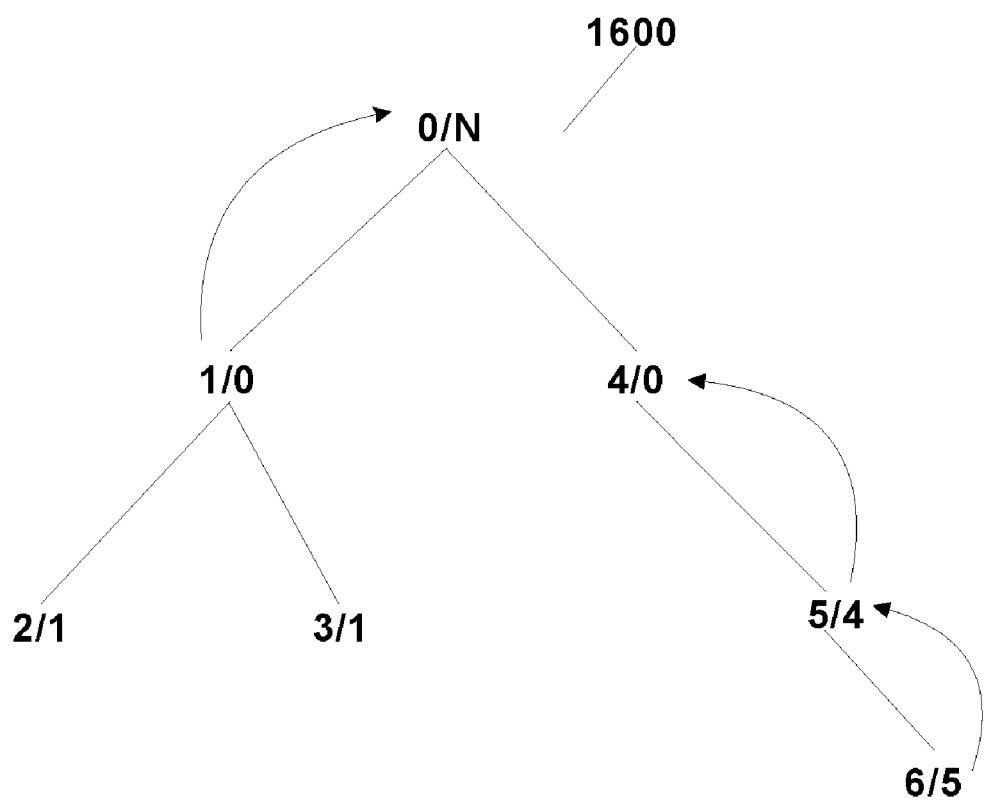
FIG. 16 shows a tree.

FIG. 16 shows a tree 1600. Node 0/N is a node with a node ID=0 and a parent ID=null. Node 0/N has a child node of 1/0 and a child node of 4/0. Node 1/0 is a node with a node ID=1 and a parent ID=0. Node 1/0 has a child node of 2/1 and a child node of 3/1. Node 2/1 is a node with a node ID=2 and parent ID=1. Node 3/1 is a node with a node ID=3 and parent ID=1. Node 4/0 has a child node of 5/4. Node 5/4 is a node with a node ID=5 and a parent ID=4. Node 5/4 has a child node of 6/5. Node 6/5 is a node with a node ID=6 and a parent ID=5.

FIG. 16 further shows node 1/0, node 5/4 and node 6/5 are to be merged into their parent nodes respectively. In one or more exemplary embodiments, the rule for merging nodes may be stored in a transformation definition table. For example, a transformation definition table specifies the merging of node 1/0, node 5/4 and node 6/5 may be provided. It is noted that other transformation definition sources may be used, such as XSLT and parsable strings as described previously.

In a transformation definition source (e.g., table, XSLT, a parsable string), a rule that specifies merging of one node with a parent node may be associated with the parent node. For example, in FIG. 3, a merged node may be referred to by a "Merge Node Offset" from a parent node (node ID 3 in table 200), thus the rule removes the node 3 (e.g., node p77287) from the tree, which is associated with the parent node (e.g., node Host).

In another exemplary embodiment, a rule that specifies merging of one node with a parent node may be associated with the affected node (e.g., removed node). For example, the rule removes node 1/0 from FIG. 16 may be associated with the node 1/0 in a transformation definition source. In following description with regard to FIGS. 16, 17 and 18, it is assumed that the rules removing each node in FIG. 16 are associated with each removed node itself in a transformation definition source (e.g., a transformation definition table).

Figure 17:
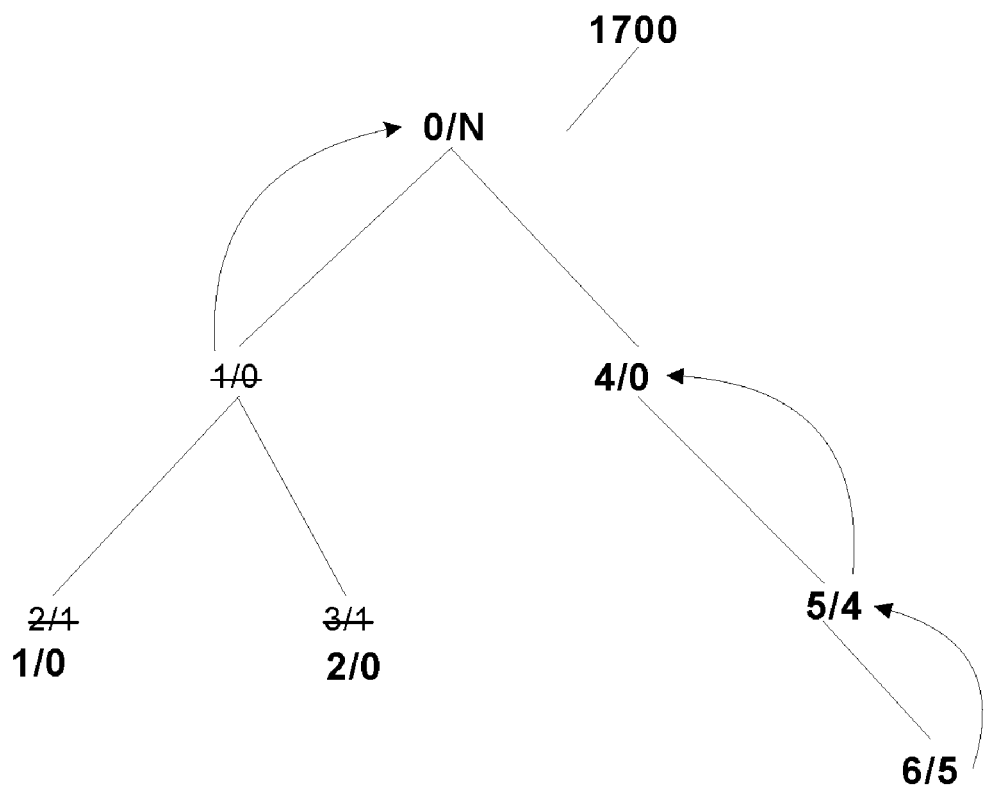
FIG. 17 shows a tree after compression.

FIG. 17 shows a tree 1700. The tree 1700 is the tree 1600 shown in FIG. 16 during compression.

Figure 18:
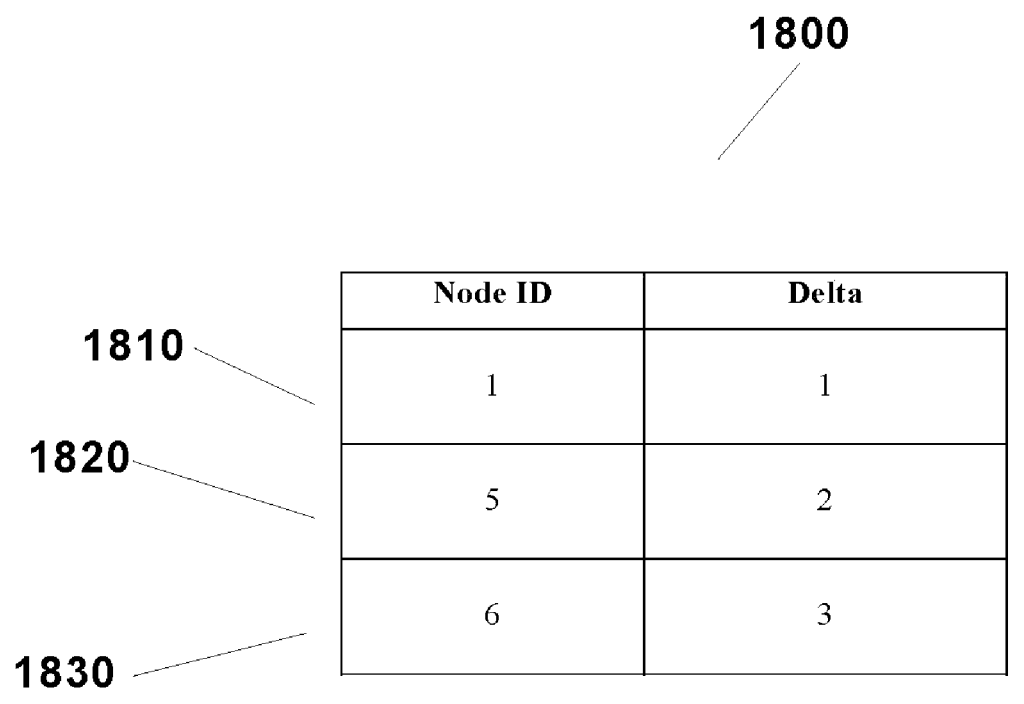

FIG. 18 shows a delta table 1800. The delta table 1800 includes entries 1810, 1820, and 1830.

In step 705 of FIG. 7, a current node pointer is set to the root node of the tree. In the case of FIG. 16, the current node pointer is set to the node 0/N.

In step 710, a determination is made as to whether there is a rule for node 0/N in a transformation definition source (e.g., a transformation definition table). In the case of FIG. 16, there is no rule for node 0/N in the transformation definition table. When there is no rule for the current node, the method executes step 750.

When there is a rule, step 715 is executed and a first rule from the transformation definition table is obtained. For example for node 1/0 in FIG. 16, a rule in the transformation definition table specifies that the node is to be deleted.

In step 720, the first rule from the transformation definition table is applied. For example, FIG. 17 shows that a rule exists in the transformation definition table for node 1/0 to be deleted.

In step 725, a determination is made as to whether a node is removed from the topology tree by deleting a line in a tree table. When a node is removed, step 730 is performed. In step 730, the number of removed nodes is increased such that counter N=N+1. When a node is not removed, the method executes step 740.

In step 735, a new entry is created in the delta table. In FIG. 18, an entry 1810 is added to delta table since the rule for node 1/0 indicates that node 1/0 is to be deleted. The entry 1810 adds the node ID of the removed node to the Node ID column and a value to the Delta column. In column Delta, the method of the present invention writes the current value of N. The rule contained in the transformation definition table has now been applied entirely to the tree table.

In step 740, a determination is made as to whether additional rules exist for the tree node in the transformation definition table. When there is an additional rule, the method executes step 745. At step 745, the next rule is fetched and then method executes step 720.

When there are no additional rules, the method executes step 750. A determination is made in step 750 as to whether there is an entry for the tree node in the delta table 1800. When there is no entry for the tree node, the method executes step 756. In the example of node 1/0, the current node has been deleted, thus the method executes the step 756 to check if the node ID and/or parent ID need to be updated. Since 1/0 node is deleted, there is no node IDs to be updated, the method continues to step 760.

When there is an entry for the tree node, the method executes step 755 which updates the IDs of the tree node such that Node ID=Node ID−N and Parent ID=Parent ID−Delta. For example, when the method of the present invention performs a lookup in the delta table 1800 and finds an entry 1810 for the parent ID of child node 2/1, this means that the node ID and the parent ID of the current node 2/1 need to be updated to correct an ID mismatch. The node ID and the parent ID of the current node 3/1 is updated by using the corresponding entry 1810 from the delta table 1800 such that:

Node $ID$=Node $ID$−$N$, and

Parent $ID$=Parent $ID$−Delta.

For example, FIG. 17 shows application of a rule contained in the transformation definition table. In FIG. 17, the node 2/1 is changed to 1/0 such that the method of the present invention performs a lookup in the delta table for the parent ID (value 1) of the current node 2/1. For node ID 1, a delta value of 1 is found in the delta table 1800.

The method of the present invention applies the delta value found in the delta table 1800 and the current value of counter N representing the number of removed nodes to the node ID and parent ID of the current node 2/1. The node ID is updated according to the following formula: Node ID=Node ID−N, so in the example: Node ID=2−1=1. The parent ID is updated according to the following formula: Parent ID=Parent ID−Delta, so in the example: Parent ID=1−1=0. Now the ID mismatch caused by the deletion of node 1/0 is repaired for the current node.

In step 760, a determination is made as to whether further tree nodes exist. When there are further tree nodes, the method executes step 765 which sets the current node pointer to the next node and then executes step 710.

During the compression of the tree 1600, FIG. 17 shows that because node 1/0 is being deleted, child node 3/1 is being updated such that it becomes node 2/0. Furthermore, FIG. 17 shows nodes 5/4 and 6/5 are being deleted, and FIG. 18 shows entries 1820 and 1830 are added to the delta table 1800. For each node removed from the tree, a new entry is generated in the delta table and counter N is increased by 1. Therefore counter N has a current value equal to the current running total number of entries in the delta table.

When there are no further tree nodes, the method ends in step 770. When the method of the present invention ends and is complete the compressed tree may be displayed via a display arrangement.

Figure 8:
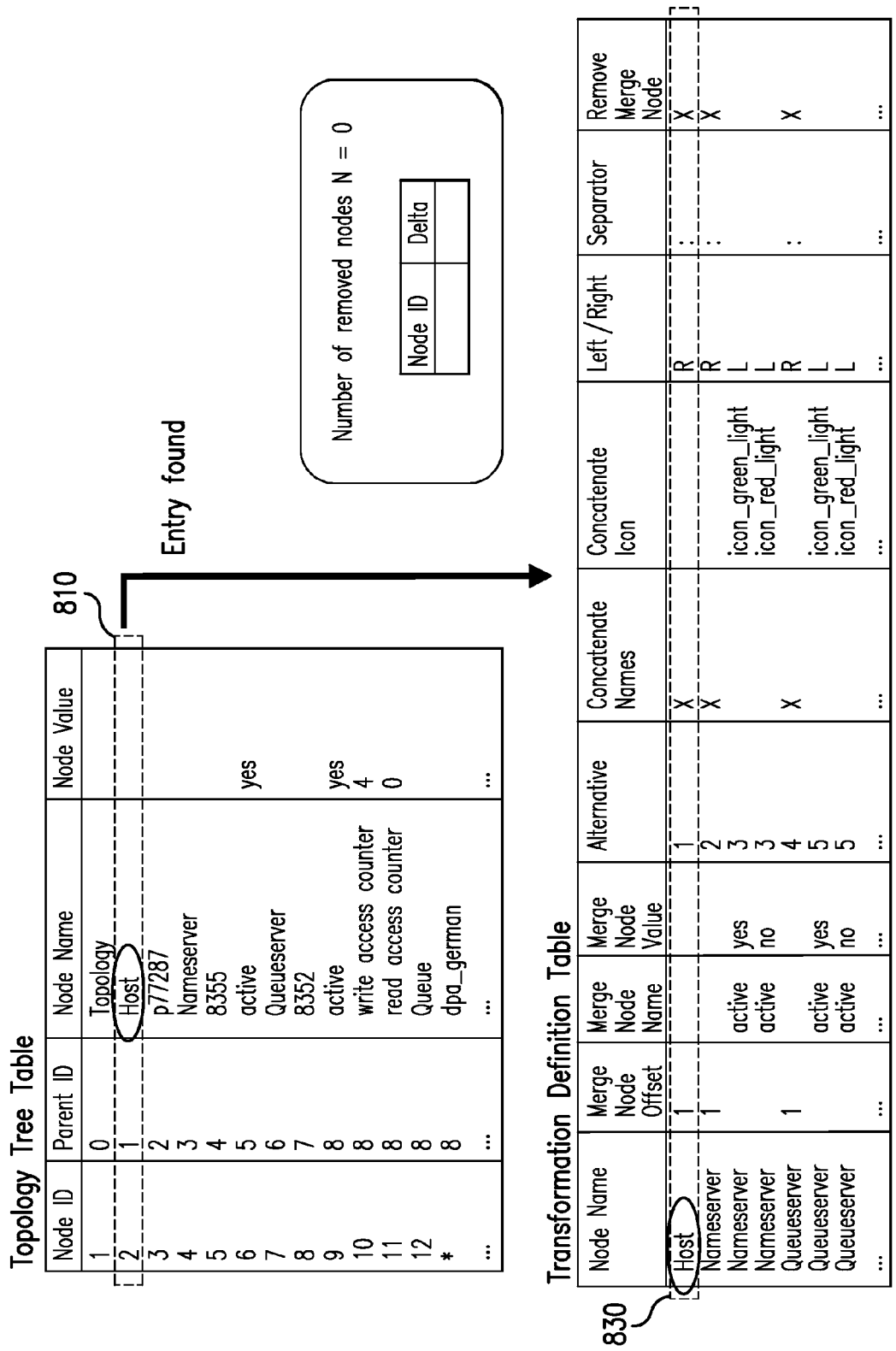
FIG. 8 shows a node entry in the transformation definition table.

Additionally, in order to describe a more specific example of compressing a tree according to the present invention, FIG. 7 is described below with reference to FIGS. 8 to 15. In step 705, a current node pointer is set to the root node of the tree. In step 710, a determination is made as to whether there is a rule for the current node. As shown in FIG. 8, the transformation definition table, which is the table 400 in FIG. 4, has no rule for the root node named "Topology". The method then executes step 750, which determines whether there is an entry for the current node in the delta table. As the current node is the root node, there is no entry in the delta table yet, the method then executes step 760. At step 760, the method determines there are further nodes in the tree and then executes step 765, which set the current node pointer to the next node in the tree table of FIG. 8. The next node is the tree node 810 with a node name of "Host". Thus, the method set the current node pointer to node "Host" and executes step 710.

When there is a rule, step 715 is executed and a first rule from the transformation definition table 520 (e.g., table 400)

is obtained. For example, FIG. 8 shows an entry 830 that is found for the node with node name "Host" in the transformation definition table. This line is interpreted as a rule. The rule says that the name of the node subsequent to the "Host" node (offset 1) is to be concatenated with the name of the current node ("Host") on the right, separated by ":". After the concatenation, the node that immediately follows the current node is to be deleted. In accordance with the rule, FIG. 9 shows that the method of the present invention finds the node that immediately follows the current node ("Host") in the topology tree table is node "p77287".

In step 720, the first rule from the transformation definition table 520 is applied to tree node 810. For example, FIG. 10 shows the execution of applying of the rule contained in the transformation definition table. In step 1 of FIG. 10, the node name "p77287" of the following tree node is concatenated with the name of the current node ("Host") on the right, separated by ":". The new name of the current node is therefore "Host: p77287".

In step 725, a determination is made as to whether a node is removed from the topology tree by deleting a line in the tree table 540. When a node is removed, step 730 is performed. In step 730, the current node pointer is set to the pointer of the deleted node and the number of removed nodes is increased such that N=N+1. In step 2 of FIG. 10, since the marked line in the transformation definition table specifies that the following node is to be deleted (flag "Remove Merge Node" has value "X"), the counter N is increased by 1. When a node is not removed, the method executes step 740.

In step 735, a new entry is created in delta table 600, 530. The new entry adds the Node ID of the removed node to the Node ID column 610 and a value to the Delta column 620.

For example, FIG. 11 shows execution of step 4 and step 5 for applying of the rule contained in the marked line of the transformation definition table. In step 4 of FIG. 11, a new line is written into the delta table. In column Node ID, the method of the present invention writes the ID of the node ("p77287") that is to be removed from the topology tree table. In column Delta, the method of the present invention writes the current value of N. In step 5 of FIG. 11, node "p77287" is removed from the topology tree table. The rule contained in the marked line of the transformation definition table has now been applied entirely to the topology tree table.

In step 740, a determination is made as to whether additional rules exist for the tree node in a transformation definition table. When there is an additional rule, the method executes step 745 which skips to the next rule and then executes step 720. When there are no additional rules, the method executes step 750. A determination is made in step 750 as to whether there is an entry for the tree node in a delta table. When there is no entry for the tree node, the method executes step 756 to check if the node ID and/or parent ID need to be updated. For example, in step 3 of FIG. 10, the method of the present invention checks whether the node ID and parent ID of the current node have to be changed. In this case, since there are no entries in the delta table so far, no update is necessary for the node IDs. If there is node IDs need to be updated, the method executes step 757, in which the node ID and the parent ID may be updated such that:

Node *ID*=Node *ID*−*N*, and

Parent *ID*=Parent *ID*−*N*.

Figure 19:
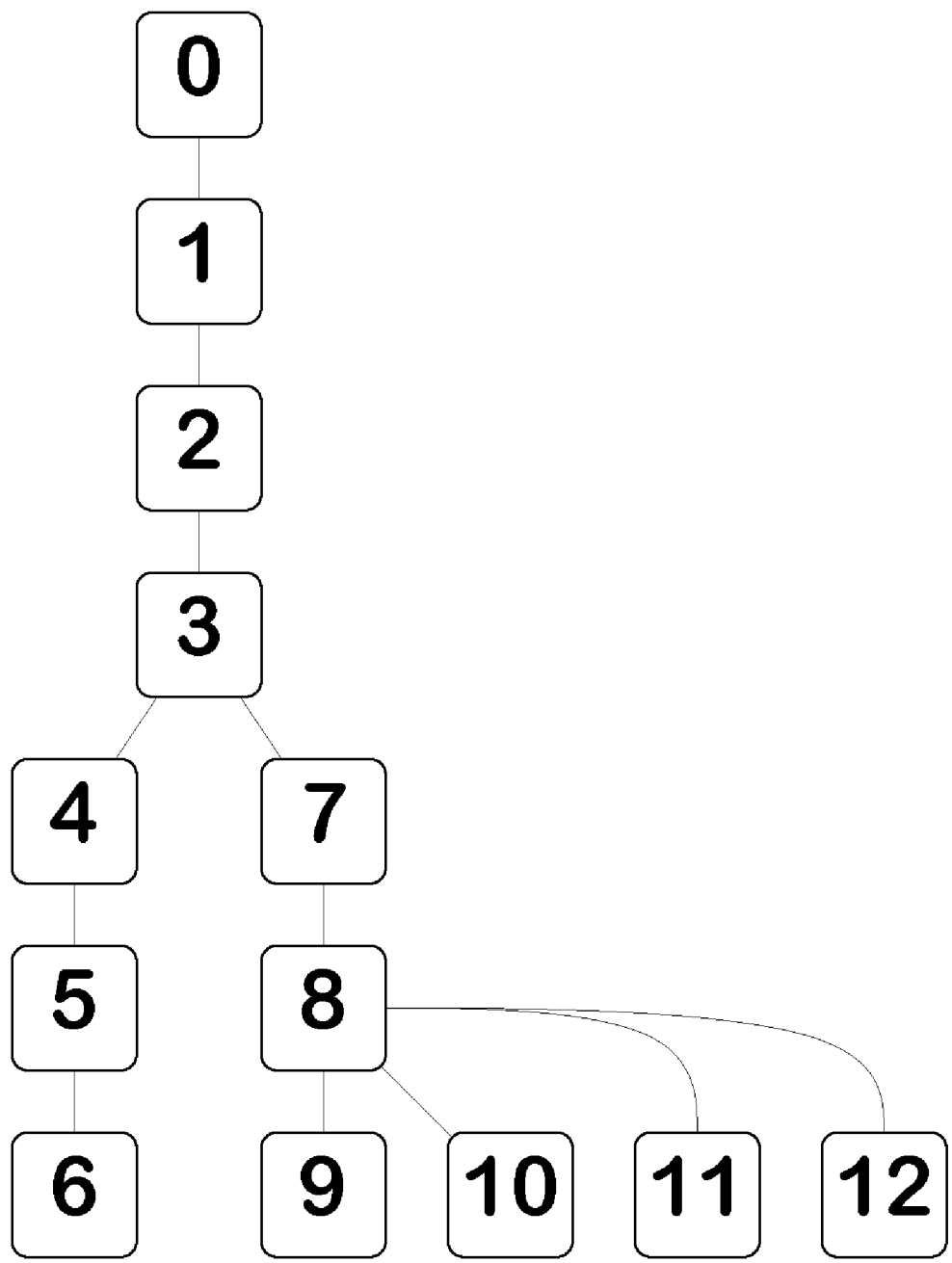
FIG. 19 shows a part of a tree corresponding to the topology tree table shown in FIG. 2.
Figure 20:
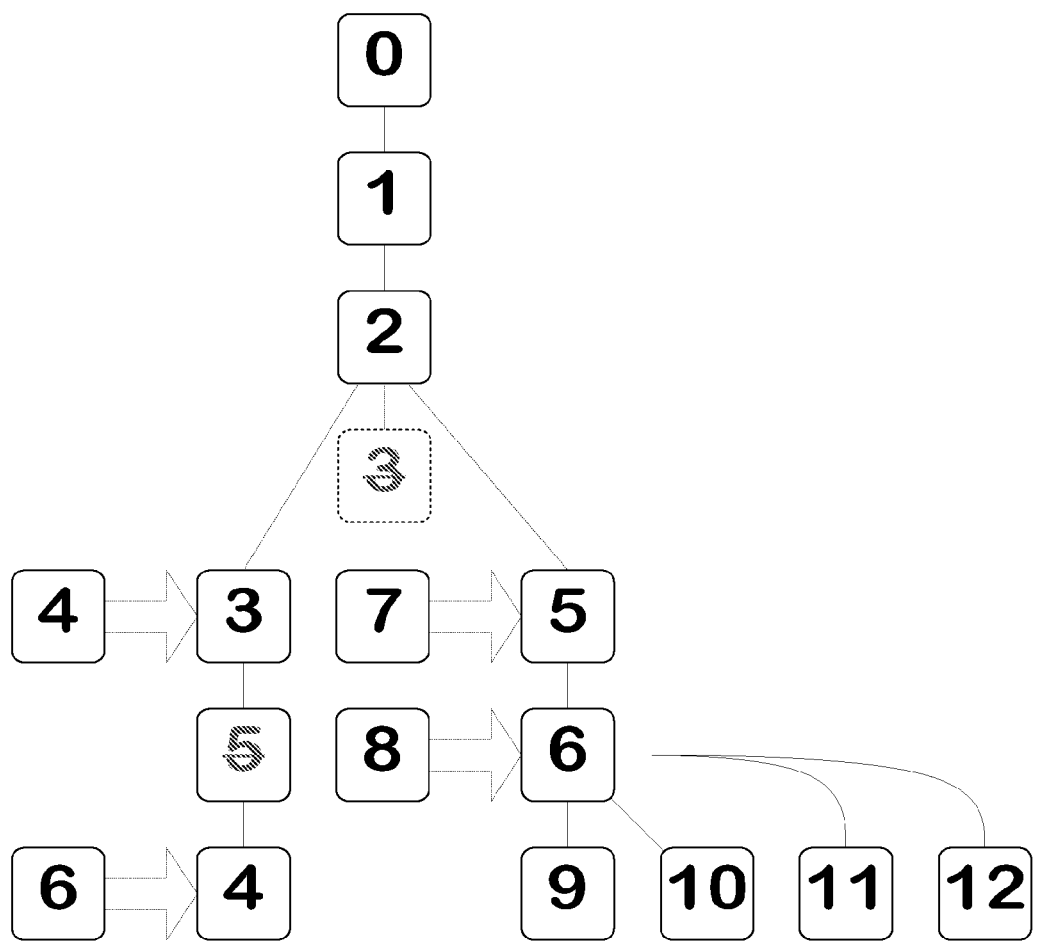
FIG. 20 shows the partial tree of FIG. 19 during compression.

For example, FIG. 19 shows a top portion of a tree corresponding to the topology tree table in FIG. 2. FIG. 20 shows the partial tree of FIG. 19 during compression by applying rules defined in the transformation table 400 of FIG. 4. As shown in FIG. 20, the node with old node ID of 8 is being updated to a new node ID of 6, and the node's parent ID also needs to be updated to 5. Applying the formula of Node ID=Node ID−N, the new node ID is equal to the old node ID minus the current running total of number of nodes deleted, which is 2. Thus, new node ID is derived by 8−2, which is 6. Also, applying the formula of Parent ID=Parent ID−N, the new parent ID is equal to the old parent ID minus the current running total of number of nodes deleted, which is 2, thus, the new parent ID is derived by 7−2, which is 5.

When there is an entry for the tree node, the method executes step 755 which updates the IDs of the tree node such that Node ID=Node ID−N and Parent ID=Parent ID−Delta. For example, when the method of the present invention performs a lookup in the delta table and finds an entry for the parent ID of a current node and in the transformation definition table there are no corresponding entries for current node, this means that the node ID and the parent ID of the current node need to be updated to correct an ID mismatch. The node ID and the parent ID of the current node is updated by using the corresponding information from the delta table such that:

Node *ID*=Node *ID*−*N*, and

Parent *ID*=Parent *ID*−Delta.

Figure 13:
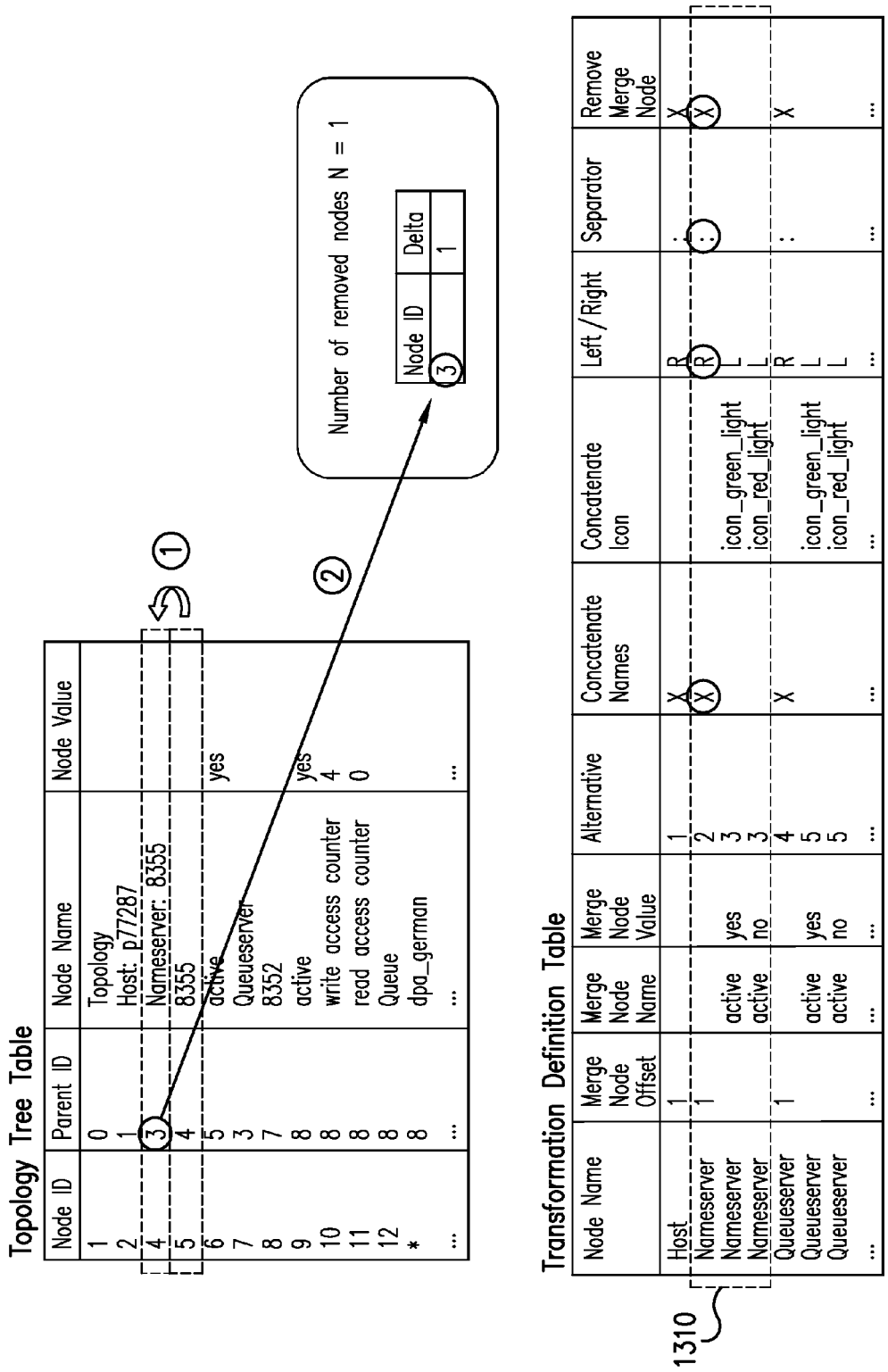
FIG. 13 shows application of a rule contained in the transformation definition table.

For example, FIG. 13 shows application of a rule contained in the transformation definition table 1310. In step 1 of FIG. 13, the node name "8355" of the node with ID 5 is concatenated to the right of the node name of the current node, using separator ":". The result is the new node name "Nameserver: 8355" for the current node. In step 2 of FIG. 13, the method of the present invention performs a lookup in the delta table for the parent ID (value 3) of the current node. For node ID 3, a delta value of 1 is found in the delta table.

Additionally, FIG. 14 shows use of a delta value found in the delta table and of the number of removed nodes N as applied to the IDs of the current node in the topology tree table. In step 3 of FIG. 14, the method of the present invention applies the delta value found in the delta table and the current value of counter N representing the number of removed nodes to the node ID and parent ID of the current node "Nameserver" in the topology tree table. The node ID is updated according to the following formula: Node ID=Node ID−N, so in the example: Node ID=4−1=3. The parent ID is updated according to the following formula: Parent ID=Parent ID−Delta, so in the example: Parent ID=3−1=2. Now the ID mismatch caused by the deletion of node "p77287" is repaired for the current node. However, all the other nodes below the current node in the topology tree still have an ID mismatch. Therefore, if an entry is found in the delta table, the node ID (and parent ID, if applicable) of every other node in the tree must be updated using the two formulas.

Furthermore, FIG. 15 shows the further application of the rule contained in the first of the three marked lines in the transformation definition table 1510. In step 4 of FIG. 15, counter N is increased by 1, since the flag "X" in column Remove Merge Node 1520 in the transformation definition table specifies that node "8355" is to be deleted. In step 5 of FIG. 15, a new line is written in the delta table: value 5 in column Node ID for the node that is to be removed and the current value of counter N in column Delta. The two entries in the delta table may be interpreted as follows. The first line records that the node with node ID 3 has been removed. It is the first node to have been removed, since the corresponding value of delta is 1. The second line records that the node with node ID 5 has also been removed. Above this node, a total of delta=2 nodes (including this node) have been removed. So for each node removed from the tree, a new entry is generated in the delta table and counter N is increased by 1. Therefore counter N is equal to the number of entries in the delta table. In step 6 of FIG. 6, the node "8355" is removed from the topology tree table.

In step 760, a determination is made as to whether further tree nodes exist. When there are further tree nodes, the method executes step 765 which sets the current node pointer to the next unvisited child and then executes step 710. For example, FIG. 9 shows the node 910 immediately following the current node that is found in the tree topology table. Also, FIG. 12 shows the tree node immediately following the current node 1210. In FIG. 12, the rule contained in the first of the three marked lines is applied 1220.

The method of the present invention applies the rule by incrementing the node ID of the current node by the value 1 obtained from column Offset Merge Node 1230 in the transformation definition table. This gives the node ID 5. This is the ID of the node with name "8355" that immediately follows the current node "Nameserver" in the topology tree table. When there are no further tree nodes, the method ends in step 770. When the method of the present invention ends and is complete the compressed topology tree may be displayed via a display arrangement.

Figure 21:
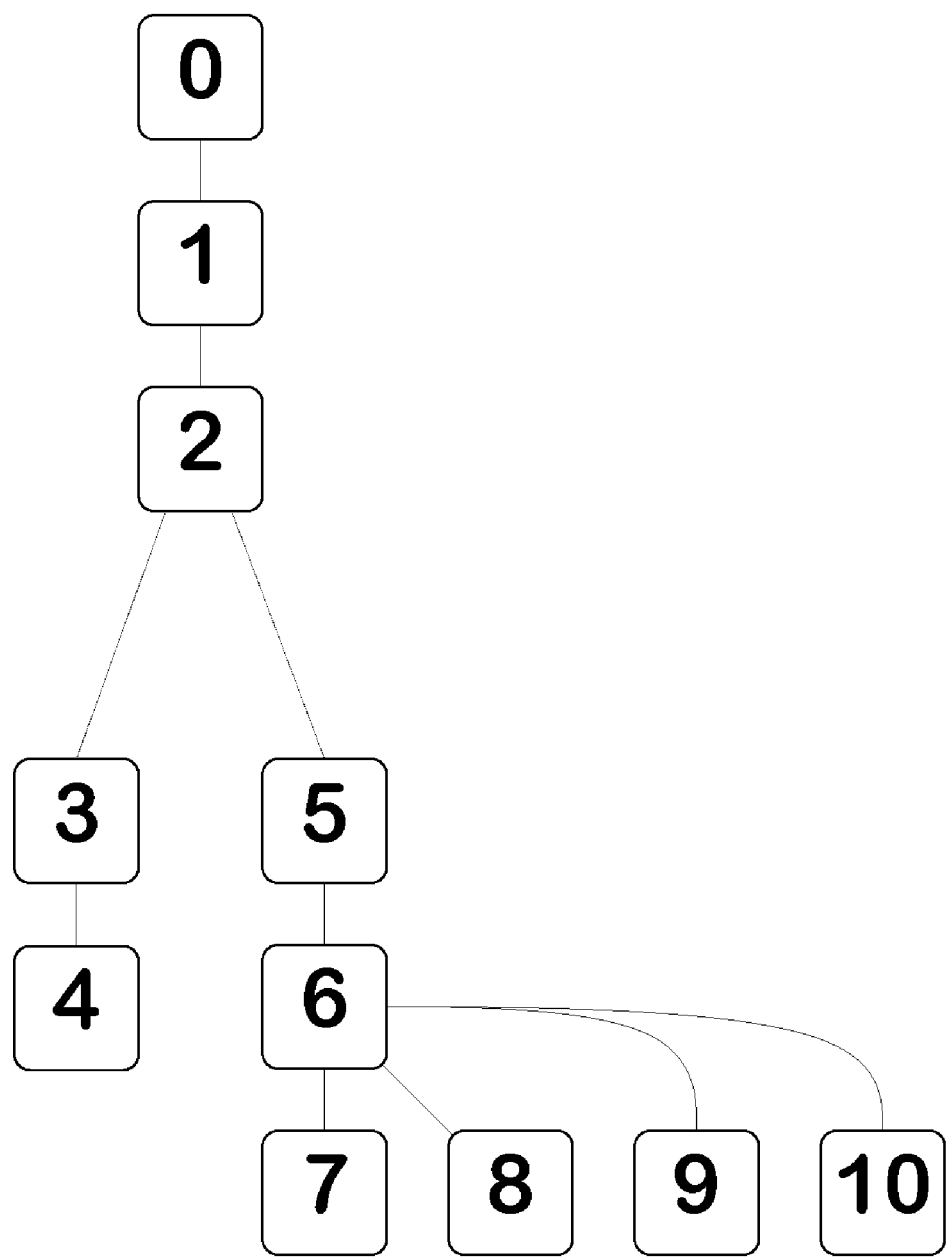
FIG. 21 shows the partial tree of FIG. 19 after applying a compression method in accordance with the present invention.

FIG. 21 shows the partial tree of FIG. 19 after applying the compression rules defined in the transformation table 400. FIG. 22 shows the top portion of the topology tree table 200 after applying the transformation table 400.

It should be noted that the transformation definition table is a useful part of an exemplary embodiment of the present invention, but the transformation definition table is not required to implement the present invention. The transformation definition table may not be used by coding the semantics contained in the transformation definition table directly into the transformation method. The method and system of the present invention works with or without the transformation definition table. The present invention provides for compressing a tree via the use of a counter N for the number of removed nodes and a delta table to update the node IDs and parent IDs of all nodes in the tree table. Hence, the present invention provides that by using a delta table and counter N, each tree node need only be visited once and the processing load involved in displaying a tree is reduced. So if N nodes are contained in the tree and M nodes are removed, then a maximum of N+M*(M+1)/2 table entries (M<<N) have to be handled, given the assumption that the search in the delta table is linear and that in the worst case all M elements have to be checked in the listed order to find the required entry.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A non-transitory machine-readable medium storing instructions adapted to be executed by a computer to perform a method for compressing a tree, the method comprising:
   a. setting a current node pointing to a root node of the tree;
   b. if a rule associates with the node identifier of the current node, applying the rule;
   c. if a node is to be deleted by applying the rule:
      deleting the node from the tree;
      storing the node identifier of the deleted node; and
      storing a parameter associated with the stored node identifier, the parameter representing a cumulative number for of nodes currently having been deleted from the tree;
   d. if the parent node identifier of the current node has previously been stored:
      setting the node identifier of the current node in the tree to a first new value, the first new value being a difference of an original value of the node identifier of the current node and a total number of nodes having been currently deleted from the tree; and
      setting the parent node identifier of the current node in the tree to a second new value, the second new value being a difference of an original parent node identifier and a parameter associated with the original parent node identifier; and
   e. if there is a next node in the tree, setting the current node to the next node in the tree.

2. The non-transitory machine-readable medium of claim 1, wherein steps b through e are repeated until all nodes in the tree have been visited.

3. The non-transitory machine-readable medium of claim 1, wherein the tree is a topology tree.

4. The non-transitory machine-readable medium of claim 3, wherein the topology tree defines a hierarchical relationship between nodes in a computer network.

5. The non-transitory machine-readable medium of claim 1, further comprising:
   if the parent node identifier of the current node has not been previously, determining the parent node identifier and the node identifier of the current node need to be updated;
   updating the parent node identifier and the node identifier by a function related to total number of nodes having been deleted.

6. The non-transitory machine-readable medium of claim 1, wherein steps b and c are repeated for a plurality of rules associated with the node identifier of the current node.

7. The non-transitory machine-readable medium of claim 1, wherein in step b, the rule is stored in a transformation definition table.

8. The non-transitory machine-readable medium of claim 1, wherein the tree includes at least one of hierarchical data, computer network data, and node data.

9. The non-transitory machine-readable medium of claim 1, wherein node identifiers of each deleted node is stored in a first data field of a data structure, and a parameter associated with each node identifier of a deleted note is stored in a second data field of the data structure, each parameter represents a cumulative number for nodes having been deleted from the tree when a respective deleted node is deleted.

10. The non-transitory machine-readable medium of claim 1, wherein data representing the tree is stored a data structure comprising:
    a first data field for storing a node identifier identifying each node of the tree respectively, and
    a second data field for storing a parent node identifier identifying a respective parent node for each node.

11. A method for compressing a tree using a data structure, the tree including a plurality of nodes, each node associated with a node identifier and a parent node identifier, the method comprising:
    a. setting a current node pointing to a root node of the tree;
    b. if a rule associates with the node identifier of the current node, applying the rule;
    c. if a node is to be deleted by applying the rule:
       deleting the node from the tree;

storing the node identifier of the deleted node in the data structure; and storing a parameter associated with the stored node identifier in the data structure, the parameter representing a number of nodes currently having been deleted from the tree;

d. if the parent node identifier of the current node has previously been stored in the data structure:

setting the node identifier of the current node to a first new value, the first new value being a difference of an original value of the node identifier of the current node and a total number of nodes having been currently deleted from the tree; and setting the parent node identifier of the current node to a second new value, the second new value being a difference of an original parent node identifier and a parameter associated with the original parent node identifier; and e. if there is a next node in the tree, setting the current node to the next node.

12. The method of claim 11, wherein steps b through e are repeated until all nodes in the tree have been visited.

13. The method of claim 11, wherein the tree is a topology tree.

14. The method of claim 11, further comprising: if the parent node identifier of the current node has not been previously stored in the data structure, determining the parent node identifier and the node identifier of the current node need to be updated; updating the parent node identifier and the node identifier by a function related to total number of nodes having been deleted.

15. The method claim 11, wherein steps b and c are repeated for a plurality of rules associated with the node identifier of the current node.

16. The method of claim 11, wherein in step b, the rule is stored in a transformation definition table.

17. The method of claim 11, wherein in step b, the node is deleted by removing a line in a tree table.

18. The method of claim 11, wherein the tree includes at least one of hierarchical data, computer network data, and node data.

19. The method of claim 13, wherein the topology tree defines a hierarchical relationship between nodes in a computer network.

20. A storage device storing a first data structure for use in a single pass compression operation to be performed on a data tree, said first data structure comprising:

a plurality of entries, each entry corresponding to a node of the data tree to be compressed, each entry comprising:

a node identifier field to store an identifier of a node of the data tree to be deleted; and a delta parameter field to store an identifier of a cumulative number of nodes from the tree structure selected for deletion in the single pass compression operation from a root node of the data tree up to the node represented by the node identifier of the respective entry, wherein the data tree is stored as a data array, the data array stores data of each node of the data tree in respective rows of the data array and further stores node identifiers for each of the nodes and parent-child relationships among the nodes, wherein entries are added to the first data structure on a single pass through the data array, beginning with a row representing a root node of the data tree, in which nodes from the data tree are selected for deletion, and wherein on the single pass through the data array beginning with a row representing a root node of the data tree:

rows are deleted from the data array, data for remaining rows are modified to re-label node identifiers thereof in consecutive order, and data representing the parent-child relationships are modified to correspond to the re-labeled node identifiers.

* * * * *